United States Patent [19]

Ahr et al.

[11] 4,042,549

[45] Aug. 16, 1977

[54] STABILIZERS FOR VINYL HALIDE RESINS CONTAINING A METAL HALIDE AND AN ETHOXYLATED ALKYLPHENOL

[75] Inventors: Robert L. Ahr; Philip H. Rhodes, both of Cincinnati, Ohio

[73] Assignee: Emery Industries, Inc., Cincinnati, Ohio

[21] Appl. No.: 618,256

[22] Filed: Sept. 30, 1975

[51] Int. Cl.² .............................................. C08J 3/20
[52] U.S. Cl. ............................ 260/23 XA; 252/400 R; 252/407; 260/45.7 R; 260/45.75 R; 260/45.85 R; 260/45.95 G; 260/45.75 W
[58] Field of Search ............... 260/23 XA, 45.7 R, 38, 260/45.95 G, 45.85 R, 45.75 W, 45.75 R; 252/400, 400 R, 407

[56] References Cited

U.S. PATENT DOCUMENTS

| | | | |
|---|---|---|---|
| 3,396,132 | 8/1968 | Perry et al. | 260/45.95 G |
| 3,759,856 | 9/1973 | Rhodes | 260/23 XA |
| 3,793,274 | 2/1974 | Hiyama | 260/23 XA |
| 3,850,874 | 11/1974 | Grazen | 260/38 |
| 3,859,236 | 1/1975 | Blewett et al. | 260/45.7 R |

*Primary Examiner*—Eugene C. Rzucidlo
*Attorney, Agent, or Firm*—Gerald A. Baracka; John D. Rice

[57] ABSTRACT

Improved liquid stabilizers consisting of a metal halide and an ethoxylated alkylphenol are provided to impart superior thermal stability to PVC resins while minimizing early color formation. The stabilizers may optionally contain a polyglycerol partial ester and/or liquid fatty acid.

11 Claims, No Drawings ated octyl- and nonylphenols being particularly useful.
IMPROVED STABILIZERS FOR VINYL HALIDE RESINS CONTAINING A METAL HALIDE AND AN ETHOXYLATED ALKYLPHENOL

BACKGROUND OF THE INVENTION

The utility of liquid stabilizers is well recognized throughout the plastics industry and liquid stabilizer systems suitable for use with PVC and other resins have been disclosed. The principal advantage of liquid stabilizer systems is the ease of handling and ability to rapidly and uniformly disperse the stabilizer in the resin so that optimum stabilization can be quickly and consistently achieved.

In U.S. Pat. No. 3,759,856 we have disclosed liquid stabilizers obtained by mixing the Group II metal halide with a polyglycerol partial ester and the use of these stabilizer compositions with vinyl halide resins to impart improved antistatic and antifogging properties in addition to stabilizing the resin against the deleterious affects of oxygen, heat and light. While the metal halide/polyglycerol partial ester stabilizers impart excellent thermal stability to PVC it has been found that the resins show some yellowing after only about ten minutes processing. While the resins do not appreciably discolor until very near the point of thermal degradation the early color formation is nevertheless undesirable to the plastic processor since it makes it difficult to match the colors of different batches, prevents the use of the resin for applications where water-white formulations are required and makes it difficult to work off regrinds of trimmings and other waste materials. It would be highly desirable and advantageous if highly compatible liquid stabilizers resistant to early color formation were available.

SUMMARY OF THE INVENTION

It has now quite unexpectedly been found that by replacing all or a portion of the polyglycerol partial ester in the liquid stabilizers of U. S. Pat. No. 3,759,856 with an ethoxylated alkylphenol or a mixture of an ethoxylated alkylphenol and liquid fatty acid that significant improvement in the early color retention of vinyl resins can be achieved.

In their broadest terms the liquid stabilizers of this invention consist of a Group II metal halide, a small amount of water sufficient to dissolve the metal halide and an ethoxylated alkylphenol. Additionally, liquid fatty acids and/or polyglycerol partial esters may be present. The liquid stabilizers are homogeneous solutions obtained by first dissolving the metal halide in a small amount of water and then mixing with the organic components. The preferred compositions of this invention contain zinc chloride or zinc chloride in combination with another metal chloride. Ethoxylated alkylphenols containing 2 to 6 condensed ethylene oxide units and a branched or straight-chain alkyl radical containing 6 to 18 carbon atoms are used, with ethoxylated octyl- and nonylphenols being particularly useful. It is especially useful in the preparation of the preferred liquid stabilizers to include a liquid fatty acid containing from 4 to 18 carbon atoms, and more preferably 9 to 18 carbon atoms, and/or a polyglycerol partial ester having no more than 75% of the hydroxyl groups reacted and derived from a polyglycerol containing 2 to 10 condensed glycerol units and an aliphatic or aromatic monocarboxylic acid containing 6 to 24 carbon atoms. In general, the stabilizer compositions of this invention contain (on a weight basis) about 0.5 to 18% metal halide, 0.25 to 6% water, 44.25 to 99.25% ethoxylated alkylphenol and up to about 55% liquid fatty acid, polyglycerol partial ester or a mixture of polyglycerol partial ester and liquid fatty acid. These liquid stabilizers are particularly effective with PVC homopolymers and copolymers in amounts such that the resin contains from about 0.01 by 2% by weight of the Group II metal.

DETAILED DESCRIPTION

The present invention relates to improved liquid stabilizers of the type disclosed in U. S. Pat. No. 3,759,857 wherein all or a portion of the polyglycerol partial ester component is replaced with an ethoxylated alkylphenol or a mixture of an ethoxylated alkylphenol and a liquid fatty acid. In other words, this invention encompasses liquid stabilizers which contain a metal halide in sufficient water to dissolve the metal halide with either (a) an ethoxylated alkylphenol, (b) a polyglycerol partial ester and an ethoxylated alkylphenol, (c) an ethoxylated alkylphenol and a liquid fatty acid or (d) a polyglycerol partial ester, an ethoxylated alkylphenol and a liquid fatty acid. All of the above stabilizer formulations may additionally contain one or more other components to further enhance the stabilizer activity or impart other desirable properties to the stabilized resin.

The liquid stabilizers of this invention find utility with a wide variety of vinyl halide resins, however, they are primarily used with polyvinyl chloride (PVC) homopolymers and copolymers. In general, they are useful with vinyl polymers derived from one or more vinyl monomers, that is, containing a HC=C< group including, for example, vinyl chloride, vinyl bromide, vinyl acetate, vinylidene chloride, vinyl alkyl ethers, acrylic and methacrylic acids and esters thereof such as ethyl acrylate and methyl methacrylate, acrylonitrile, methacrylonitrile and the like. Copolymers obtained by the co-polymerization of vinyl chloride with one or more comonomers may also be effectively stabilized with these liquid stabilizers. Also, the compositions of this invention may be used with other polymer systems such as butadiene-styrene copolymers, butadiene-acrylonitrile copolymers, acrylonitrile-butadiene-styrene terpolymers and the like. They may also be used with blends of one or more of the above polymer compositions. The liquid stabilizers are especially effective and best results are obtained with PVC homopolymers and copolymers wherein the vinyl chloride content (bound) is at least 80% of the polymer composition.

Metal halides useful for the preparation of the instant stabilizer compositions are Group II metal halides. The halide moiety may be bromide or chloride, however, best results are obtained when Group II metal chlorides are used. Metals useful for the present invention include Group IIA and Group IIB metals such as magnesium, calcium, strontium, barium, cadmium and mixtures thereof. Stabilizers prepared from zinc, calcium or magnesium chlorides and mixtures of these metal chlorides are particularly useful since they can be used in food packaging film applications where non-toxic properties are required. Zinc chloride is a preferred metal halide and is advantageously employed by itself or in combination with magnesium, calcium, or barium chlorides.

To obtain stabilizers having improved early color retention, an ethoxylated alkylphenol is used in combination with the metal halide and optionally a liquid fatty acid or polyglycerol partial ester. Useful ethoxylated alkylphenols corresponds to the formula

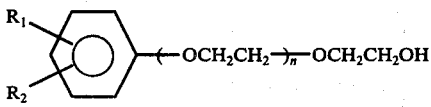

wherein $R_1$ is an alkyl radical, branched or straight-chain, containing from 6 to 18 carbon atoms, $R_2$ is hydrogen or an alkyl radical as defined for $R_1$ and $n$ is an integer from 1 to 5 and, more preferably, from 2 to 4. Especially useful ethoxylated alkylphenols have $R_2=H$, $n=2$ to 4 and $R_1$ is an alkyl radical containing 8 to 12 carbon atoms and substituted at the para position on the aromatic ring. Octyl and nonyl phenols ethoxylated within the above-described limits are especially preferred for this invention.

Polyglycerol partial esters used in conjunction with the liquid fatty acid and/or the ethoxylated alkylphenols are the partial esterification products of polyglycerols and monocarboxylic acids. Useful polyglycerols for this purpose are condensation products of 2 up to about 30 glycerol molecules accompanied by the elimination of water. Preferably, the partial esters are derived from polyglycerols containing 2 to 10 condensed glycerol units. Suitable polyglycerols include, for example, diglycerol, triglycerol, tetraglycerol, pentaglycerol, hexaglycerol, octaglycerol, decaglycerol and the like. In addition to the polyglycerols, other polyether polyols such as the condensation products of sorbitol, mannitol, pentaerythritol, trimethylolpropane or mixtures thereof may also be partially esterified and used for the preparation of the compositions of this invention. The monocarboxylic acids used in the formation of the partial esters are aromatic or aliphatic monocarboxylic acids containing from about 6 to 24 carbon atoms and corresponding to the following formula R—COOH wherein R is an alkyl, aryl, alkaryl, or aryalkyl radical. Preferably aliphatic acids containing about 12 to 18 carbon atoms or mixtures thereof will be employed. These preferred fatty acids or their mixtures may contain both saturated or unsaturated acids and are obtainable from natural products such as vegetable and animal fats and oils. For example, coconut oil, cottonseed oil, soybean oil, tall oil, tung oil, tallow and lard are typical sources which provide mixed acids useful for the esterification of polyglycerol.

The polyglycerol partial esters are obtained using known esterification techniques, catalysts and reaction conditions. The reaction is carried out so that the polyglycerol will not be completely esterified, that is, not all of the hydroxyl groups will be reacted. Not more than 75%, and preferably less than 50%, of the polyglycerol hydroxyl groups will be converted to ester moieties. The degree of esterification and the particular polyglycerol and fatty acid employed will be varied depending on the properties desired.

Fatty acids which can be used in combination with the ethoxylated alkylphenol and/or the polyglycerol partial ester are fatty acids which are liquids at room temperature and have boiling points above about 160° C. These liquid fatty acids contain from about 4 to 18 carbon atoms and can be either straight-chain or branched-chain acids which are saturated or contain olefinic unsaturation. Liquid products which are a mixture of fatty acids having these characteristics can also be employed. Illustrative liquid fatty acids useful for this invention are butyric acid, valeric acid, caproic acid, caprylic acid, pelargonic acid, capric acid, 2-ethyl-hexoic acid, isostearic acid, oleic acid, linoleic acid isononanoic acid, neodecanoic acid, neotridecanoic acid, isotridecanoic acid, isohexanoic acid, isooctanoic acid and the like. Especially useful liquid fatty acids for this invention are pelargonic acid, isostearic acid, oleic acid and mixtures of oleic and linoleic acids. In an especially preferred embodiment of this invention where the stabilizers will be used in PVC formulations acceptable for use in food grade applications, oleic acid is employed.

The liquid stabilizers are prepared by mixing an aqueous solution of the metal halide with the organic components. As a general rule, as little water as possible is used in preparing the liquid stabilizers to facilitate compatability of the metal halide and the organic components. Typically, the aqueous solution will contain from about 40 to 90% by weight metal halide and to facilitate solution of the metal halide it may be desirable to heat the solution, however, before combination of the aqueous solution with the organic components it should be allowed to cool to room temperature. Aside from this precaution, mixing the aqueous metal halide solution and the organic component requires no special mixing procedures and they are readily compatible.

In general, the stabilizer compositions of this invention contain (on a weight basis) about 0.5 to 18% metal halide, 0.25 to 6% water, 44.25 to 99.25% ethoxylated alkylphenol and up to about 55% liquid fatty acid, polyglycerol partial ester or a mixture of polyglycerol partial ester and liquid fatty acid. Preferably, the liquid stabilizers contain 1.5 to 12% metal halide, 0.5 to 4% water, 40 to 83% ethoxylated alkylphenol and 15 to 45% fatty acid and/or polyglycerol partial ester.

While liquid stabilizers prepared in accordance with the above-defined limitations impart excellent heat stability with good early color retention to PVC resins it may nevertheless be desirable to incorporate one or more other additives into the liquid stabilizer package. Such additives may constitute from about 0.01% to about 25 weight percent of the liquid stabilizer, however, it is more customary that these additives be less than 15 percent of the stabilizer package. It will be understood that certain of these additives may be incorporated directly into the stabilizer without detracting from the desirable properties of the liquid stabilizer system whereas other additives are not compatible with the liquid stabilizer and must be blended directly with the resin either before or after incorporation of the liquid stabilizer.

Additional additives may include, for example, supplemental stabilizers, antistatic agents, antifogging agents, lubricants, antistick agents, tinting agents, optical brighteners and the like which are compatible with the resin. Typical supplementary stabilizers can include benzophenone derivatives such as 2,2'-dihydroxybenzophenone and 2-hydroxybenzophenone or stabilizers derived from benzotriazoles, triazines, phenylsalicylates and the like. Phenolic stabilizers containing one or two alkyl groups, preferably tertiary alkyl groups, immediately adjacent to the hydroxyl groups on the aromatic nucleus may also be used. Particularly useful are organophosphorouscompounds containing at least one —OR group bonded to the phosphorous atom wherein R is a hydrocarbon radical such as aryl, alkyl, alkaryl, aralkyl or cylcoaliphatic or heterocyclic group. These radicals will generally contain from about 1 to about 24 carbon atoms. Such phosphites are represented by the general formula:

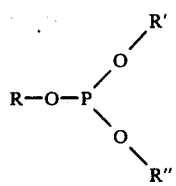

wherein R is one of the above defined groups and R' and R" are hydrogen or a radical as defined above for R. The R groups may be the same or they may be different. Phosphite stabilizer compounds of the above type include monophenyl phosphite, diphenyl phosphite, triphenyl phosphite, tricresyl phosphite, tri(octylphenyl) phosphite, tri(nonylphenyl) phosphite, tri(p-tert-nonylphenyl) phosphite, tribenzyl phosphite, tri(2-cyclohexyl) phosphite, tricyclopentyl phosphite, tri(tetrahydrofurfuryl) phosphite, monoisooctyl phosphite, diisooctyl phosphite, triisooctyl phosphite, tri- dodecyl phosphite, diisooctyl phenyl phosphite, diphenyl decyl phosphite, issooctyl diphenyl phosphite, tri(2-ethylhexyl) phosphite and the like. Also useful are phosphite compounds wherein R' and R" join to form ring systems as illustrated in the formulae

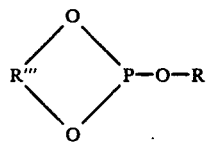

and

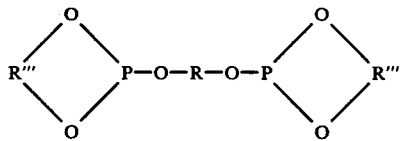

wherein R'''is a bivalent hydrocarbon radical and R is a monovalent radical, as previously defined, or a divalent radical derived therefrom. Triphosphites, that is, where R, R' and R" are all hydrocarbon radicals either the same or different, are a preferred embodiment of the instant invention. Tri(alkaryl) phosphites are preferred with tri(nonylphenyl) phosphite being especially useful since this phosphite has been approved in PVC films for food packaging applications. Epoxy stabilizer compounds such as epoxidized monocarboxylic acids, glycidyl ethers of polyhydric alcohols or phenols and epoxy polyethers of polyhydric phenols can also be included in the stabilizer formulation.

The stabilizers of this invention are readily incorporated in PVC resins and have good compatibility therewith. Conventional mixing techniques such as kneading, milling or mixing with a Banbury, ribbon or similar mixer are employed and no special processing is required to incorporate these stabilizers into the resin. The solution may be used immediately after preparation or, since the liquid stabilizers do not separate upon standing, they may be stored and used as required. To achieve effective stabilization the amount of stabilizer is adjusted so that the resin contains from about 0.01 to 2% of the Group II metal and, more preferably, about 0.05 to 0.5% of the metal.

The liquid stabilizers may be used in combination with other known compounding ingredients including plasticizers, pigments and colorants, fillers, lubricants, antioxidants, processing and extrusion aids and the like. These compounding ingredients may be prepared as a masterbatch and added separately to the resin or combined and added with the liquid stabilizer.

As indicated above the present stabilizers are particularly useful with PVC homopolymers and copolymers. They are particularly useful, however, with plasticized resins of the above type and especially where the plasticizer is an epoxidized naturally occuring oil present in an amount up to as much as 100% based on the weight of the resin. Useful epoxidized naturally occuring oils which are mixtures of epoxidized higher fatty acid esters include epoxidized soybean oil, epoxidized olive oil, epoxidized cottonseed oil, epoxidized coconut oil, epoxidized tall oil, epoxidized tallow and the like. The liquid stabilizers are especially useful with PVC resins plasticized with epoxidized soybean oil.

The following examples illustrate the invention more fully, however, they are not intended to limit the scope thereof. In these examples all parts and percentages are on a weight basis unless otherwise indicated.

EXAMPLE I

A series of liquid stabilizers were prepared with the following compositions:

| | |
|---|---|
| Stabilizer Ia - | 10.5% zinc chloride, 3.5% water and 86% ethoxylated nonylphenol[1] |
| Stabilizer Ib - | 10.5% zinc chloride, 3.5% water, 43% ethoxylated nonylphenol[1] and 43% polyglycerol partial ester[2] |
| Stabilizer Ic - | 10.5% zinc chloride, 3.5% water, 43% ethoxylated nonylphenol[1] and 43% oleic acid[3] |
| Stabilizer Id - | 10.5% zinc chloride, 3.5% water, 29% ethoxylated nonylphenol[1], 29% polyglycerol partial ester[2] and 28% oleic acid[3]. |

[1]Four moles ethylene oxide per mole of alkylphenol group.
[2]About 30% of the hydroxyl groups of the polyglycerol (containing on an average 2.3 condensed glycerol units) esterified with oleic and mixed $C_8-_{10}$ saturated fatty acids. [3]Emersol 233 Oleic Acid, Acid Value 200-204, Iodine Value 86-90, manufactured by Emery Industries, Inc.

All of the above liquid stabilizer solutions were formulated to contain 5% zinc metal and were prepared by first dissolving the zinc chloride (anhydrous) in water with heating. After the zinc chloride was dissolved and the solution allowed to cool to room temperature the remaining ingredients were blended therewith with agitation.

The resulting clear yellow liquid stabilizer solutions were employed with the following PVC resin formulations:

| | Parts |
|---|---|
| PVC Homopolymer (Diamond Shamrock 450) | 100 |
| Dioctyl Adipate | 20 |
| Epoxidized Soya[1] | 10 |
| Palmitic/Stearic Acid Mixture (50/50) | 0.5 |
| Tri(nonylphenyl) Phosphite | 1 |
| Liquid Stabilizer | 0.3 |

[1]6.5% min. Oxirane Value

The amount of stabilizer employed was calculated so that 0.15% zinc metal was present in the formulated resin. The ingredients were first blended and then milled at 330° F for about 15 minutes. Water white films were obtained with each of the liquid stabilizer systems and evaluated for heat stability. The heat stability test was conducted by arranging eight 1 inch × 1 inch × 35 mil coupons of each stabilized resin on a glass tray which was then placed in a rotating device in an electric oven maintained at 375° F. Heating was continued for 80 minutes and a coupon of each stabilized resin sample removed at ten minute intervals. After cooling the test specimens were visually inspected for discoloration and other signs of degradation. All of the above-formulated resins stabilized with the liquid stabilizers of the present invention exhibited good early color retention and withstood the entire 80 minutes heat period without failure, that is, without degradation (severe discoloration or charring). After 80 minutes all the samples were still clear with only slight discoloration (yellowing).

EXAMPLE II

To further demonstrate the improved results obtained with the liquid stabilizers of this invention and the ability to significantly improve the early color retention of resins stabilized therewith the following stabilizers (each containing 4.32% zinc) were prepared using the compounds described in Example I:

| | |
|---|---|
| Stabilizer IIa - | 9% zinc chloride, 3% water and 88% ethoxylated nonylphenol |
| Stabilizer IIb - | 9% zinc chloride, 3% water, 44% ethoxylated nonylphenol and 44% polyglycerol partial ester |
| Stabilizer IIc - | 9% zinc chloride, 3% water, 44% ethoxylated nonylphenol and 44% oleic acid |
| Stabilizer IId - | 9% zinc chloride, 3% water, 29.4% ethoxylated nonylphenol, 29.3% polyglycerol partial ester and 29.3% oleic acid |
| Stabilizer IIe - | 9% zinc chloride, 3% water and 88% polyglycerol partial ester. |

The resulting liquid stabilizers were incorporated into PVC homopolymer in accordance with the following formulation:

| | Parts |
|---|---|
| PVC Homopolymer | 100 |
| Dioctyl Adipate | 32 |
| Epoxidized Soya | 8 |
| Stearic Acid[1] | 0.5 |
| Antistatic/Antifogging Additive[2] | 4.0 |
| Liquid Stabilizer | 0.3 |

[1]Emersol 132 Stearic Acid manufactured by Emery Industries, Inc.
[2]A mixture of polyol partial esters.

Resin samples were prepared using each of the above stabilizers. The ingredients were first blended with the PVC and then a 50 gram sample of the resin evaluated in a Brabender plasticorder. This instrument provides a convenient means for testing the dynamic thermal stability of resins and is designed to simulate extrusion conditions by the application of heat and shear to the resin. The test was conducted at 192° C using a No. 6 head (rotor) at a speed of 60 rpm. During the first 30 minutes of operation samples were removed at two minute intervals to determine the early color retention of the resin. After 30 minutes, sampling was discontinued but the test was continued until resin decomposed and the time required to achieve degradation (evidenced by a sharp decrease in torque) recorded. For each of the resins stabilized with the liquid stabilizers of this invention (II a-d) the early color retention was excellent through the initial 30 minute heating period. With the resin containing liquid Stabilizer (e) marked discoloration was developed after about 10 to 14 minutes even though thermal stability of the resins (time of degradation) was comparable to and in some cases better than that obtained with Stabilizers II a-d.

EXAMPLE III

To demonostrate the versatility of the invention and the ability to prepare useful stabilizer compositions using pelargonic acid and capric acid, liquid stabilizers having the following compositions were prepared in accordance with the above-described procedures:

| | SAMPLE NO. | |
|---|---|---|
| | IIIa | IIIb |
| Aqueous solution containing 75% zinc chloride | 12 | 12 |
| Ethoxylated nonylphenol | 44 | 44 |
| Pelargonic acid | 44 | — |
| Capric acid | — | 44 |

In both instances clear liquid stabilizer solutions were obtained which, when incorporated into the PVC formulation of Example I at a 0.3 phr level, exhibited good early color retention and good thermal stability.

EXAMPLE IV

Additional liquid stabilizer preparations were made for evaluation in PVC homopolymer resin. The compositions were as follows:

| | SAMPLE NO. | | | | | | | |
|---|---|---|---|---|---|---|---|---|
| | IVa | IVb | IVc | IVd | IVe | IVf | IVg | IVh |
| Zinc chloride | 10.5 | 4.3 | 3 | 5.58 | 9 | 7.88 | 1.85 | 7.88 |
| Calcium chloride | — | — | — | — | — | 3.5 | 0.3 | 3.5 |
| Water | 3.5 | 4.3 | 1 | 1.92 | 3 | 6.12 | 0.95 | 6.12 |
| Ethoxylated nonylphenol | 4.3 | 41.4 | | 65.5 | 29.4 | 10 | 86.9 | 41.25 |
| Oleic acid | 4.3 | 50 | 15 | 29 | 29.3 | 36.25 | — | 41.25 |
| Polyglycerol partial ester | — | — | — | — | 29.3 | 36.25 | 10 | 41.25 |

All of the above preparations were homogeneous liquids compatible with PVC homopolymer and copolymer to provide excellent protection against thermal degradation. Resins stabilized with these formulations also exhibited good early color retention.

EXAMPLE V

145 Parts of a commercial PVC copolymer formulation suitable for use as meat packaging film and containing epoxidized soya, an antistatic agent, an antifogging agent and blue tint was blended with 1 part tri(nonylphenyl) phosphite, 0.25 part stearic acid and 0.3 part liquid stabilizer Ic. This product, evaluated in the static oven test at 375° F, exhibited excellent early color retention and thermal stability. No significant degradation was observed through 70 minutes oven aging.

EXAMPLE VI

Still other homogeneous liquid stabilizer solutions were prepared as follows:

| | SAMPLE NO. | | | | |
|---|---|---|---|---|---|
| | VIa | VIb | VIc | VId | VIe |
| Zinc chloride | 9 | 7.88 | 9 | 9 | 9 |
| Magnesium chloride | — | 3.5 | — | — | — |
| Water | 3 | 6.12 | 3 | 3 | 3 |
| Ethoxylated nonylphenol | | | | | |
| 4 E.O. per mol | — | 41.25 | 44 | — | — |
| 6 E.O. per mol | 88 | — | — | 44 | 29.4 |
| Oleic acid | — | 41.25 | — | — | — |
| Isostearic acid | — | — | 44 | 44 | 29.3 |
| Polyglycerol partial ester | — | — | — | — | 29.3 |

These formulations all provide good heat stability and early color retention when incorporated in PVC homopolymer at less than one phr level.

We claim:

1. An improved liquid stabilizer for vinyl halide resins which comprises 0.5 to 18% by weight of (a) a Group II metal halide; 0.25 to 6% by weight of (b) sufficient water to dissolve said metal halide; and 44.25 to 99.25% by weight of (c) an ethoxylated alkylphenol of the formula

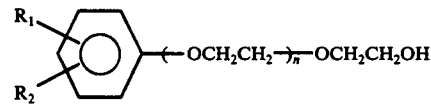

wherein $R_1$ is an alkyl radical containing from 6 to 18 carbon atoms, $R_2$ is hydrogen or an alkyl radical as defined for $R_1$ and $n$ is an integer from 1 to 5.

2. The liquid stabilizer of claim 1 which additionally contains up to about 55% by weight of a member (d) selected from the group consisting of (1) a liquid fatty acid containing 4 to 18 carbon atoms, (2) a polyglycerol partial ester derived from a polyglycerol containing 2 to 10 condensed glycerol units and having not more than 75% of the available hydroxyl groups esterified with an aromatic or aliphatic monocarboxylic acid containing 6 to 24 carbon atoms and (3) mixtures of said liquid fatty acids and polyglycerol partial esters.

3. The liquid stabilizer of claim 1 wherein (a) is selected from the group consisting of zinc chloride, magnesium chloride, calcium chloride and barium chloride and in the formula for (c) $R_1$ is an alkyl radical containing 8 to 12 carbon atoms located in the para position, $R_2$ is hydrogen and $n$ is an integer from 2 to 4.

4. The liquid stabilizer of claim 3 wherein (a) is zinc chloride or a mixture of zinc chloride with magnesium chloride, calcium chloride or barium chloride and (c) is ethoxylated octyl- or nonylphenol.

5. The liquid stabilizer of claim 2 wherein (a) is selected from the group consisting of zinc chloride, magnesium chloride, calcium chloride, and barium chloride and in the formula for (c) $R_1$ is an alkyl radical containing 8 to 12 carbon atoms located in the para position, $R_2$ is hydrogen and $n$ is an integer from 2 to 4.

6. The liquid stabilizer of claim 5 containing 1.5 to 12% (a), 0.5 to 4% (b), 40 to 83% (c) and 15 to 45% (d) wherein the liquid fatty acid contains 9 to 18 carbon atoms and the polyglycerol ester has no more than 50% of the hydroxyl groups esterified with a fatty acid containing 12 to 18 carbon atoms.

7. The liquid stabilizer of claim 6 wherein (a) is zinc chloride or a mixture thereof with magnesium chloride, calcium chloride or barium chloride, (c) is ethoxylated octyl- or nonylphenol and (d) is oleic acid.

8. The liquid stabilizer of claim 6 wherein (a) is zinc chloride or a mixture thereof with magnesium chloride, calcium chloride or barium chloride, (c) is ethoxylated octyl- or nonylphenol and (d) is a mixture of oleic acid and a polyglycerol partial ester derived from predominantly $C_{18}$ fatty acids.

9. A vinyl halide polymer resin stabilized with the liquid stabilizer of claim 1 so that about 0.01 to 2% of the Group II metal is present in the resin.

10. The resin of claim 9 wherein the vinyl halide polymer is a polyvinyl chloride homopolymer or copolymer.

11. The resin of claim 10 plasticized with epoxidized soybean oil and stabilized with a liquid stabilizer in an amount such that the resin contains about 0.05 to 0.5% of the Group II metal, said liquid stabilizer containing about 1.5 to 12% zinc chloride or mixture thereof with magnesium chloride, calcium chloride or barium chloride, 0.5 to 4% water, 40 to 83% ethoxylated octyl- or nonylphenol and 15 to 45% oleic acid or mixture of oleic acid with a polyglycerol partial ester derived from predominantly $C_{18}$ fatty acids.

* * * * *